United States Patent [19]

Newton

[11] 3,800,966
[45] Apr. 2, 1974

[54] LOADER CRANE FOR GOOSENECK TRAILER

[76] Inventor: Gary Newton, General Delivery, Eckley, Colo. 80227

[22] Filed: July 12, 1971

[21] Appl. No.: 161,837

[52] U.S. Cl............. 214/77 R, 214/505, 214/508, 280/423 R
[51] Int. Cl.............................................. B65g 1/48
[58] Field of Search......... 214/77 R, 78, 80, 130 R, 214/130 A, 75 R, 766; 280/423 A, 423 R, 425 R, 425 B

[56] References Cited
UNITED STATES PATENTS

| | | | |
|---|---|---|---|
| 3,080,988 | 3/1963 | Redman | 214/78 |
| 3,484,003 | 12/1969 | Strandberg et al. | 214/77 R |
| 3,404,792 | 10/1968 | Frieberg | 214/80 |
| 3,174,630 | 3/1965 | Tantlinger et al. | 214/77 R |
| 3,602,375 | 8/1971 | Martinson | 214/77 R |
| 3,406,852 | 10/1968 | Winckler | 280/423 R X |
| 3,433,503 | 3/1969 | Davis | 280/423 R X |
| 3,102,562 | 9/1963 | Horncastle | 214/77 R UX |
| 3,253,716 | 5/1966 | Stratton | 214/77 R X |
| 3,288,315 | 11/1966 | Bigden | 214/506 |
| 3,421,791 | 1/1969 | Lindquist | 214/77 R |

FOREIGN PATENTS OR APPLICATIONS

| | | | |
|---|---|---|---|
| 1,037,490 | 7/1966 | Great Britain | 214/130 R |
| 1,318,514 | 1/1963 | France | 214/80 |
| 245,123 | 6/1960 | Australia | 214/77 R |

*Primary Examiner*—Robert J. Spar
*Attorney, Agent, or Firm*—Van Valkenburgh, Lowe & Law

[57] ABSTRACT

The present invention incorporates a loader crane with a gooseneck type trailer. The trailer is modified by adding a deck upon the gooseneck structure. The loader frame is mounted upon this deck to permit the boom and arm thereof to extend and swing over the bed of the trailer. The crane is hydraulically operated. Hydraulic controls for its operation are mounted upon the deck; an operator's chair is also mounted upon the deck.

3 Claims, 8 Drawing Figures

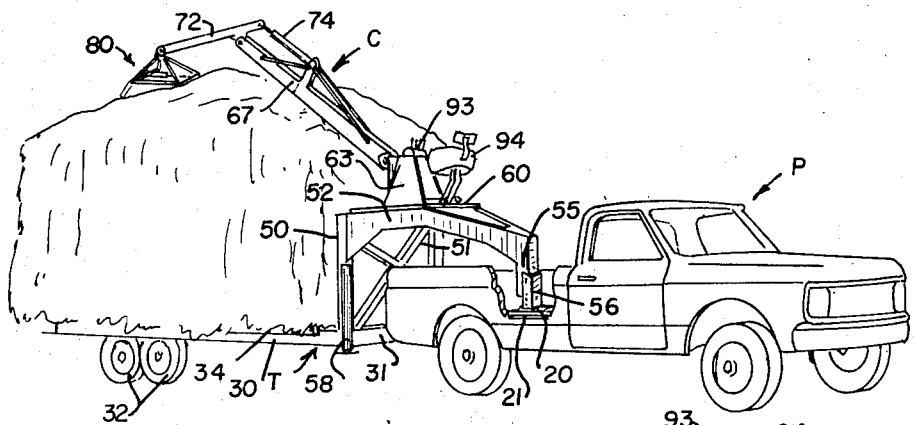
Fig. 1
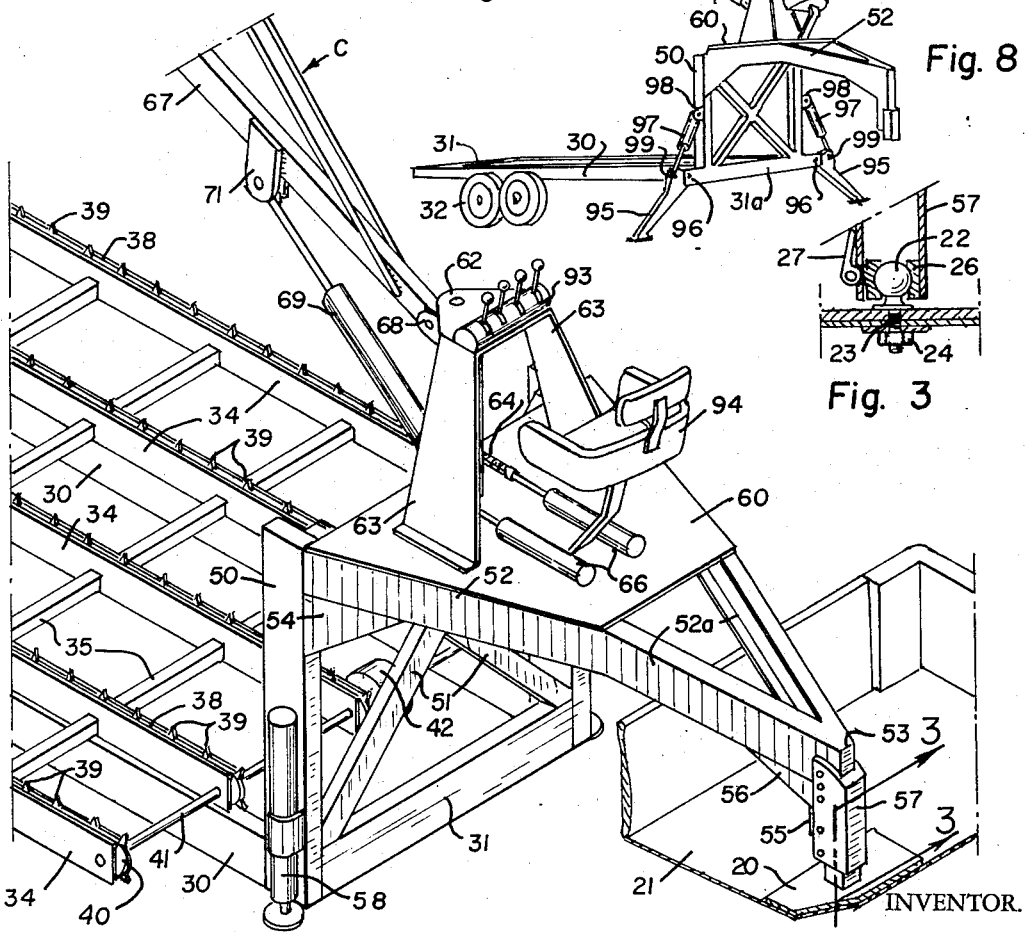
Fig. 8
Fig. 3
Fig. 2
INVENTOR.
Gary Newton
BY Van Valkenburgh & Loux
ATTORNEYS

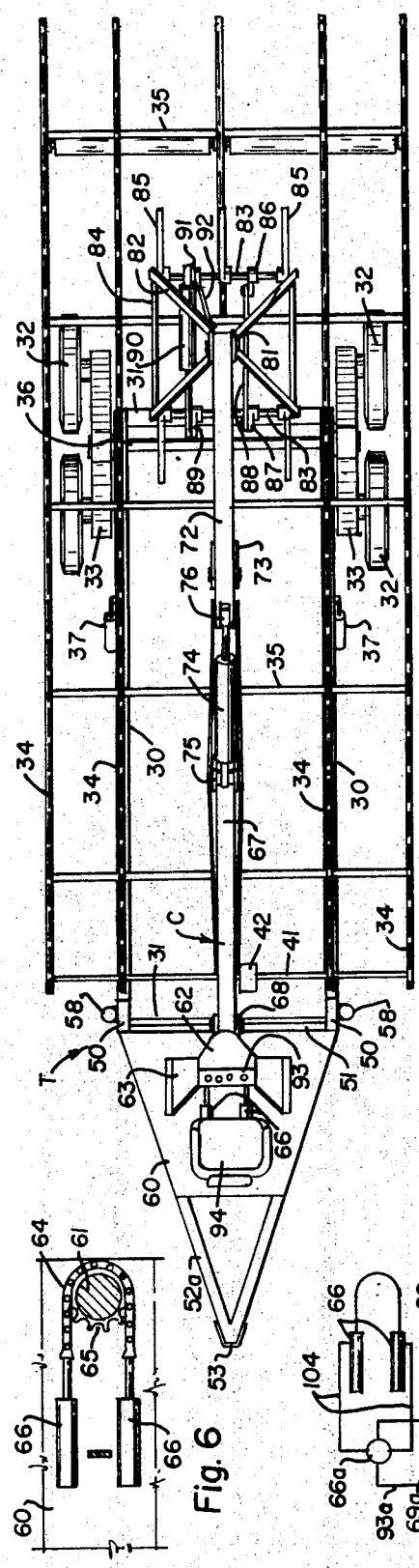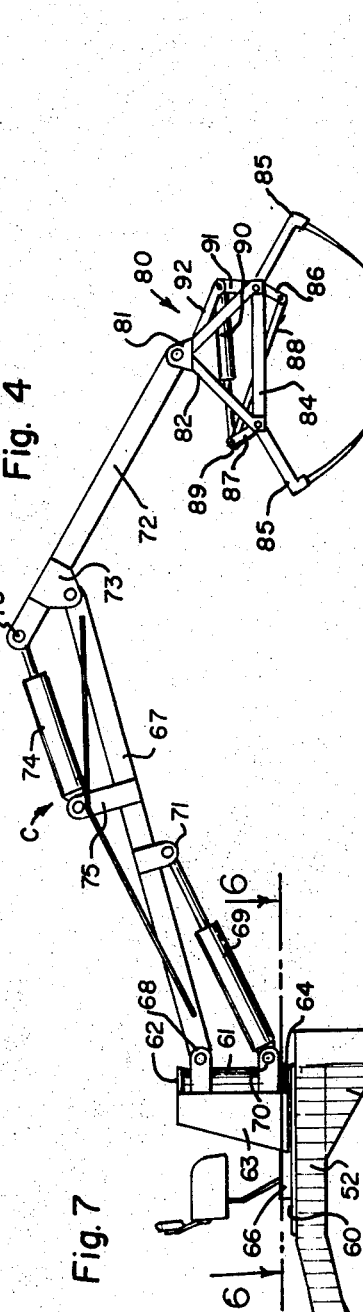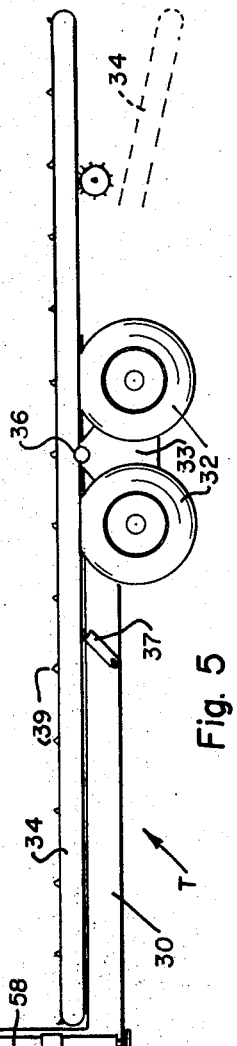

LOADER CRANE FOR GOOSENECK TRAILER

This invention relates to apparatus for loading and unloading trailers, and more particularly to a loader crane which is carried upon a trailer.

A primary object of the invention is to provide a novel and improved arrangement of a loader crane for a trailer having a so-called gooseneck hitch. Trailers having such a hitch are commonly called gooseneck trailers and thus the invention will be herein called a loader crane for a gooseneck trailer.

In recent years gooseneck hitches have become very popular over other types for trailers because the gooseneck hitches permit ordinary pick-up trucks, having one-half-ton or three-quarter-ton ratings, to haul larger trailers and pull heavier loads. Gooseneck trailers are used for many purposes, and they are especially popular on small farms for carrying hay and other materials. The present invention is especially suitable for such a use and will thus be described as a hay trailer.

The gooseneck hitch is ordinarily built upon a transverse wall-like structure upstanding from the front end of the trailer. A triangular frame cantilevers forwardly from this wall at an elevation which permits it to extend above the tailgate of a pick-up truck, over the bed of the truck and with the apex of the triangular frame being positioned above the rear axle of the truck. There, at the apex of this frame, a short column, the head of the gooseneck hitch, extends downwardly to the bed of the pick-up truck to engage a hitching ball or a fifth wheel type of connector. By connecting the gooseneck hitch at a point which is over the rear axle of the truck, a better control of the trailer is possible while it is being towed, and also, a more satisfactory load distribution on the truck can be obtained.

One problem which has been encountered with trailers of all sorts, on small farms and elsewhere, resides in the work involved in loading and unloading the trailers. This problem is pointed up whenever a small-scale farmer commences using a gooseneck trailer with his pick-up truck for he will increase the loads being hauled. The efficiency of the farmer's operation is increased by using a larger trailer and hauling heavier loads. However, this suggests the possibility of further efficiency by machine loading and unloading of the trailer.

The present invention was conceived and developed with the above considerations in view, and comprises, in essense, the provision of a deck upon the A-frame of a gooseneck hitch, and a loader crane mounted upon this deck. The crane can be designed to reach over the bed of the trailer for quick and easy loading and unloading operations.

Thus, another object of the invention is to provide a novel and improved arrangement of a loader crane upon a gooseneck trailer, where the crane is at an out-of-the-way position when it is not in use and does not take up space on the bed of the trailer to interfere with the load thereon.

Another object of the invention is to provide a novel and improved arrangement of a loader crane upon the hitch of a gooseneck trailer which is especially suitable for the loading and unloading of hay and similar material.

Another object of the invention is to provide in combination with a hay transport trailer having a gooseneck hitch which is capable of picking up or depositing an entire haystack at a time, a loader crane mounted upon the gooseneck hitch of the trailer at a position where it can easily reach all portions of a haystack carried upon the trailer to facilitate loading and unloading operations.

Other objects of the invention are to provide a loader-crane arrangement for a gooseneck trailer which is a simple, economical, versatile, rugged and durable unit.

With the foregoing and other objects to view, all of which more fully hereafter appear, my invention comprises certain constructions, combinations and arrangements of parts and elements as herein described, defined in the appended claims and illustrated in the accompanying drawings in which:

FIG. 1 is a perspective view of a pick-up truck pulling a gooseneck trailer, with the trailer being loaded with hay, and with a loader crane mounted upon the gooseneck hitch according to the present invention; FIG. 1 showing also, a portion of the wall of the truck as being broken away to better illustrate the connection of the gooseneck hitch to the bed of the truck.

FIG. 2 is an isometric view of a portion of the organization shown in FIG. 1 but with the hay load removed, and illustrating the manner in which the gooseneck hitch is modified to carry a loader crane and the base portion of the crane thereon.

FIG. 3 is a fragmentary sectional detail as taken from the indicated line 3—3 at FIG. 2 but on a further enlarged scale.

FIG. 4 is a plan view of the gooseneck trailer per se.

FIG. 5 is a left side elevational view of the trailer as shown at FIG. 4.

FIG. 6 is a fragmentary sectional detail as taken from the indicated line 6—6 at FIG. 5.

FIG. 7 is a diagram of a hydraulic system which may be used with the loader crane.

FIG. 8 is a perspective view of a portion of a trailer similar to that shown at FIG. 1 but showing the same as being modified by outriggers.

Referring more particularly to the drawing, an operative organization which includes the present invention consists of a pick-up truck P, a gooseneck trailer T connected to the pick-up truck and a loader crane C mounted upon the trailer. The drawing at FIG. 1 depicts the trailer as being loaded with hay, however, it is to be understood that while the invention is herein described as a hay trailer, it is also useful for other purposes. Likewise, vehicles other than a pick-up truck may be used to pull the trailer. For example, farm tractors and truck tractors can be adapted to connect with the gooseneck hitch of the trailer.

The pick-up truck P is necessarily modified to receive a gooseneck hitch and a reinforcing plate 20 is secured to the bed 21 of the pick-up truck in any suitable manner. The bolt of a connective ball 22 is fitted in a passageway 23, through the plate 20, the truck bed 21 and a washer therebeneath to connect with a nut 24 to rigidly hold the ball 22 as shown at FIG. 3. This connective ball 22 is located at the longitudinal center of the truck and preferably, directly above the rear axle. However, if desirable, the connection may be made a short distance ahead of or behind the rear axle point.

FIG. 3 illustrates the connective ball 22 as being engaged by the head of the gooseneck hitch as will be described. The connection illustrated depicts a conventional arrangement represented by an expandible socket member 26 within the gooseneck head, which engages the ball 22 and is locked upon the ball by a toggle lever 27. This connection is exemplary and various types and arrangements for connecting the hitch to the truck, or to a tractor, may also be used.

The base structure of the trailer T consists of a pair of longitudinal beams 30 interconnected by suitable headers 31. Tandem wheel 32 at each side of the beams are carried upon an axle frame 33 as illustrated. The axle frame 33 is not shown in detail for it is essentially conventional and it may include a spring system, although such is not shown.

The bed of this trailer is an open framework consisting of longitudinal beams 34 and transverse members 36. This bed is connected to the base by a transverse pivot 36 at the wheel mounts with the framework extending rearwardly from the pivot to permit the framework to tip rearwardly so the rear end of this framework may be to the ground as shown in broken lines at FIG. 5. The tipping is effected by a hydraulic cylinder 37 mounted upon each beam 30 with its piston rod being connected to an adjacent beam 34.

Each beam 34 is box-shaped in section and a chain 38 with grab points 39 is carried in each beam 34, the chain being extended about sprockets 40 at each end of the beam. The front sprockets 40 are carried on a shaft 41 which is driven by a hydraulic motor 42. The rear sprockets are idlers. Forward and reverse movements of the chains are thus possible, and when the framework is tipped a load of hay may be pulled onto or moved off from the trailer. This arrangement need not be described further since it is essentially conventional; also, the hydraulic lines and controls for the cylinders 37 and the motor 42 are not shown or described because conventional arrangements may be used with these components.

The gooseneck tongue of the trailer includes posts 50 upstanding from the front ends of the beams 30, immediately ahead of the framework 34. These posts are reinforced by cross braces 51, and the posts and crossbraces form a transverse wall structure at the front of the trailer. A beam 52 cantilevers forwardly from the top of each post, with the two beams converging to a forward apex 53 at the longitudinal center axis. The portions of the beams 52 adjacent to the posts are substantially horizontal while the portions 52a adjacent to the apex are tipped downwardly a small amount as best shown at FIG. 5.

A gusset plate 54 reinforces each connection between the posts 50 and beams 52. A head 55 of the gooseneck extends downwardly from the apex 53 and is reinforced by a gusset plate 56. A sleeve 57 is attached to the head and this sleeve carries the socket members 26 heretofore described. The sleeve attachment is effected by pinning it to the head at selected positions to adjust for height variations with respect to the truck bed.

To complete the trailer, jacks 58 are mounted upon each post 50 so they may extend downwardly to the ground to hold the trailer level when it is not connected to the truck. Outriggers may be used in lieu of the jacks if desired to better stabilize the trailer where the loader crane is in operation as will be hereinafter described.

This gooseneck hitch is modified for mounting the loader crane C upon it by providing a deck 60 upon the horizontal portions of the beams 52. The crane C is mounted to a vertical post 61 which is pivotally connected to the deck 60 and to the top plate 62 of a straddle frame. The side plates 63 of this frame upstand from the deck 60 at each side of the post. This post 61 is rotated by a chain 64 extending about a sprocket 65 at the base of the post and connecting with the piston rods of an opposing pair of cylinders 66 mounted upon the deck 60 as best shown at FIG. 6.

The crane includes a boom 67 pivotally secured to the ears of a clevis 68 embracing the post 61. This permits the boom 67 to swing in a vertical plane. The raising and lowering movement of the boom is effected by a hydraulic cylinder 69 having its base connected to a second clevis 70 outstanding from the post 61, and its piston rod extending to a clevis 71 at an intermediate point on the boom 67.

An extension arm 72 is pivotally connected to the extended end of the boom 67 by a clevis 73 near the inward end and at the underside of the arm 72. This clevis 73 has its pivot pin engaging the end of the boom 67. The inward end of the arm 72 generally overlies the boom to provide an elbow joint. A cylinder 74 is secured to upstanding posts 75 on the boom 67 with its piston rod pivotally connecting to the inward end of the arm 72 as at 76. Thus, the cylinder 74 actuates the arm about the extended end of the boom.

A hay fork 80 is pivotly secured to the extended end of the arm 72 as by a clevis 81 at the top of the fork. This connection permits the fork to swing as it is suspended from the arm. This hay fork may be of any suitable type and is preferably hydraulically actuated to grip and to release a load of hay.

The hay fork, suspended at the clevis connection 81, includes diagonal support bars 82 which extend downwardly and outwardly from the clevis in a pyramid-shaped framework to hold a square or rectangular frame section of the fork. This frame section consists of a pair of opposing side shafts 83 and a pair of opposing end bars 84. The diagonal support bars 82 are connected to the ends of the end bars 84, and the ends of the shafts 83 are pivotally connected to these end bars.

An array of tines 85, is affixed to each shaft 83, and in the fork illustrated each shaft carries three tines which are in spaced opposition with the tines on the other shaft. It follows that rotation of the shafts in opposite directions will move the tines together and apart. To effect this combined rotation a lever 86 extends downwardly on one shaft and a lever 87 extends upwardly from the other shaft. These levers are interconnected by a crossbar 88. To operate the fork another lever 89 upstands from one shaft to connect with the piston of a hydraulic cylinder 90 suspended above the frame. The base of the cylinder is held by a strut 91 upstanding from the other shaft 83. This strut 91 does not rotate with rotations of its supporting shaft but is held in a fixed position by a strap 92 extending from the end of the strut 91 to the clevis 81.

This crane C is controlled by an hydraulic system connecting with the cylinders 66, 69, 74 and 90 as will be described. A control head 93 is conveniently mounted upon top plate 62 of the support frame of the post 61. The controls in the head 93 are four-way valves as hereinafter described; and these valves will include handles for operation. An operator's chain 94 is conveniently mounted upon the deck 60 in front of the support frame of the post so the operator can be seated while he is facing rearwardly. Thus, he can easily operate the crane and watch the crane as he loads and unloads the trailer.

When loading and unloading hay, and when the crane is rotated from a longitudinal position directly over the deck and to a lateral position to the side of the trailer the problem of lateral stability of the trailer may not arise because the hay will not be very heavy. However, when the crane is lifting heavy loads the problem of lateral stability can be quite serious. In such a case the jacks 58 at each side of the framework may be lowered to minimize side tipping.

As a further feature, where heavy lateral loads are encountered, outriggers may be mounted upon the trailer. One arrangement of outriggers is illustrated at FIG. 8. The front header 31a of the trailer is modified by having portions extending beyond the posts 50 of the gooseneck hitch. An outrigger 95 is pivotally connected to each extended header portion as at 96. It is actuated by a cylinder 97 connected to a clevis 98 on each post while its piston rod is connected to a clevis 99 on the outrigger. These outriggers may be operated by the same hydraulic system as that which operates the crane or in any other suitable manner.

An exemplary hydraulic circuit for the apparatus is shown at FIG. 7. A pump 100, a reservoir 101, and the intake line 102 connecting these components, may be carried in the pick-up truck or on the trailer if a power source to drive the pump is available. Such pump and reservoir are not shown nor are hydraulic lines shown in the drawing since such systems are essentially conventional.

The hydraulic circuit shown at FIG. 7 includes, in addition to the pump 100, reservoir 101 and connecting line 102, a discharge line 103 to a manifold 93a in the control head 93. Four-way valves 66a, 69a, 74a and 90a connect with the manifold 93a and the lines of each extend to the several cylinders. Each line 104 of the valve 66a extends to a cylinder 66 since the cylinders 66 are single action and each operates in opposition to the others. Lines 105 of the valve 69a extend to the double acting cylinder 69. Lines 106 of the valve 74a extend to the double acting cylinder 74. Lines 107 of the valve 90a extend to the double acting cylinder 90.

All of these four-way valves have their exhaust lines connected with a manifold 109 which returns to the reservoir 101 to complete the assembly. FIG. 7 also shows two four-way valve 97a and lines therefrom to two double acting cylinders 97. These valves and cylinders are optional and are used only is outriggers such as shown at FIG. 8 are used.

I have now discussed my invention in considerable detail; however, others skilled in the art can devise and build alternate and equivalent constructions which are within the spirit and scope of my invention; hence, I desire that my protection be limited not by the constructions illustrated and described, but only by the proper scope of appended claims.

I claim:

1. A combination of a flat-bed trailer and loading means, said flat-bed trailer having a gooseneck hitch for connection with a connector in the bed of a pick-up truck wherein said gooseneck hitch includes:

a. a transverse wall-like frame upstanding from the front of said trailer and having a width corresponding to the width of the trailer frame,
   b. a generally horizontal frame cantilevered forwardly from the top of the vertical frame comprising two structural members attached to the outward corners of the vertical frame to extend forwardly and converge at the projection of the longitudinal center line of the trailer, and
   c. coupling means depending from the converging ends of the said members to connect with said connector in said pickup truck, with the vertical frame extending to a height which will permit the horizontal frame to overlie the bed walls of the pickup truck;

said loading means comprising:
   a. a deck mounted on the horizontal frame thereby being above and forwardly of the bed of said trailer,
   b. a post rotatably mounted on said deck member,
   c. first power means to rotate said post relative to said deck,
   d. said first power means including means for rotating said post with respect to said deck, said rotating means including:
      1. a chain sprocket attached to said post,
      2. a pair of parallel spaced power cylinder means mounted on said deck, and
      3. chain means passed around said sprocket and having each end attached to one of said power cylinder means whereby as one cylinder means is retracted said chain is pulled around said sprocket causing the post to rotate with respect to said deck,
   e. an articulated crane boom pivotally carried upon said post for vertical movement with respect to said post, to overreach the trailer bed and areas to the side of trailer bed,
   f. second power means to pivot said boom relative to said post,
   g. means for gripping loose material at the opposite end of said boom,
   h. third power means to articulate said boom and operate said gripping means,
   i. control means mounted on said deck operatively associated with said power means, and
   j. an operator's seat mounted on the deck forwardly of the control means and boom to permit an operator to view the trailer bed to the rear from an elevated position while operating the boom,
   k. said gripping means comprising a rectangular frame pivotally suspended from the free end of said boom and a pair of fork means having tines pivotally mounted on opposite members of said rectangular frame,
   l. said third power means including a power cylinder mounted on said rectangular frame for pivoting said fork means inwardly toward each other so as to grip said material.

2. A device as defined in claim 1, wherein:
said gooseneck hitch further includes lateral support beams mounted on each side of the vertical frame at the front of the trailer.

3. A device as defined in claim 2, wherein:
the lateral support beams comprise outriggers.

* * * * *